(12) United States Patent
Rafferty

(10) Patent No.: US 6,612,480 B1
(45) Date of Patent: Sep. 2, 2003

(54) METHOD OF FORMING PREFORMS FOR METAL REPAIRS

(75) Inventor: Kevin Rafferty, Harrison, OH (US)

(73) Assignee: C.A. Patents, L.L.C., Florence, KY (US)

( * ) Notice: Subject to any disclaimer, the term of this patent is extended or adjusted under 35 U.S.C. 154(b) by 40 days.

(21) Appl. No.: 09/717,730

(22) Filed: Nov. 21, 2000

(51) Int. Cl.$^7$ .......................... B23K 31/02; B23K 35/12
(52) U.S. Cl. ...................... 228/119; 228/245; 228/160; 228/170
(58) Field of Search ................. 228/119, 160, 228/170, 203, 245, 246, 56.3; 29/17.3, 889.1, 402.09, 402.07, 402.11, 402.13, 402.16; 427/446, 455, 456; 428/547

(56) References Cited

U.S. PATENT DOCUMENTS

| | | | |
|---|---|---|---|
| 3,293,072 A | * 12/1966 | Doolittle et al. | ............ 106/1.05 |
| 3,864,124 A | 2/1975 | Breton et al. | |
| 4,031,279 A | 6/1977 | Cremer et al. | |
| 4,194,040 A | 3/1980 | Breton et al. | |
| 4,228,214 A | 10/1980 | Steigelman et al. | |
| 4,493,451 A | * 1/1985 | Clark et al. | .................. 228/119 |
| 4,600,599 A | * 7/1986 | Wallsten | ...................... 427/178 |
| 4,726,101 A | * 2/1988 | Draghi et al. | ................ 228/119 |
| 5,040,718 A | * 8/1991 | Lee et al. | .................... 228/119 |
| 5,240,491 A | * 8/1993 | Budinger et al. | ........... 228/119 |
| 5,264,011 A | 11/1993 | Brown et al. | |
| 5,334,417 A | 8/1994 | Rafferty et al. | |
| 5,348,215 A | 9/1994 | Rafferty et al. | |
| 5,373,986 A | 12/1994 | Rafferty et al. | |
| 5,523,169 A | 6/1996 | Rafferty et al. | |
| 5,577,655 A | 11/1996 | Mizuhara | |
| 5,666,643 A | * 9/1997 | Chesnes et al. | ............. 148/528 |
| 5,783,318 A | * 7/1998 | Biondo et al. | .............. 148/512 |
| 5,817,372 A | * 10/1998 | Zheng | ......................... 427/454 |
| 5,867,762 A | 2/1999 | Rafferty et al. | |
| 5,890,274 A | * 4/1999 | Clement et al. | ......... 228/248.1 |
| 5,952,042 A | 9/1999 | Rafferty et al. | |
| 5,956,845 A | * 9/1999 | Arnold | ..................... 29/402.07 |
| 5,997,604 A | 12/1999 | Rafferty et al. | |
| 6,001,426 A | * 12/1999 | Witherspoon et al. | ....... 427/449 |
| 6,099,974 A | * 8/2000 | Lenling | ........................ 428/548 |
| 6,165,628 A | * 12/2000 | Borom et al. | ................ 428/610 |
| 6,210,812 B1 | * 4/2001 | Hasz et al. | ................. 416/241 B |
| 6,283,356 B1 | * 9/2001 | Messelling | ................ 164/92.1 |
| 6,302,318 B1 | * 10/2001 | Hasz et al. | ................. 228/254 |
| 6,355,356 B1 | * 3/2002 | Hasz | ...................... 416/241 R |
| 6,387,527 B1 | * 5/2002 | Hasz et al. | ............. 416/241 R |

* cited by examiner

*Primary Examiner*—Tom Dunn
*Assistant Examiner*—Colleen P. Cooke
(74) *Attorney, Agent, or Firm*—Killworth, Gottman, Hagan & Schaeff, L.L.P.

(57) ABSTRACT

Preforms for use in base metal repair are formed by thermally spraying preferably a blend of a braze alloy and a high temperature alloy onto a separation sheet thereby forming a preform sheet. The separation sheet is removed from the preform sheet and the preform sheet is cut to form individual preforms which can be brazed directly onto a worn area of a high temperature alloy part such as a jet engine part.

6 Claims, 1 Drawing Sheet

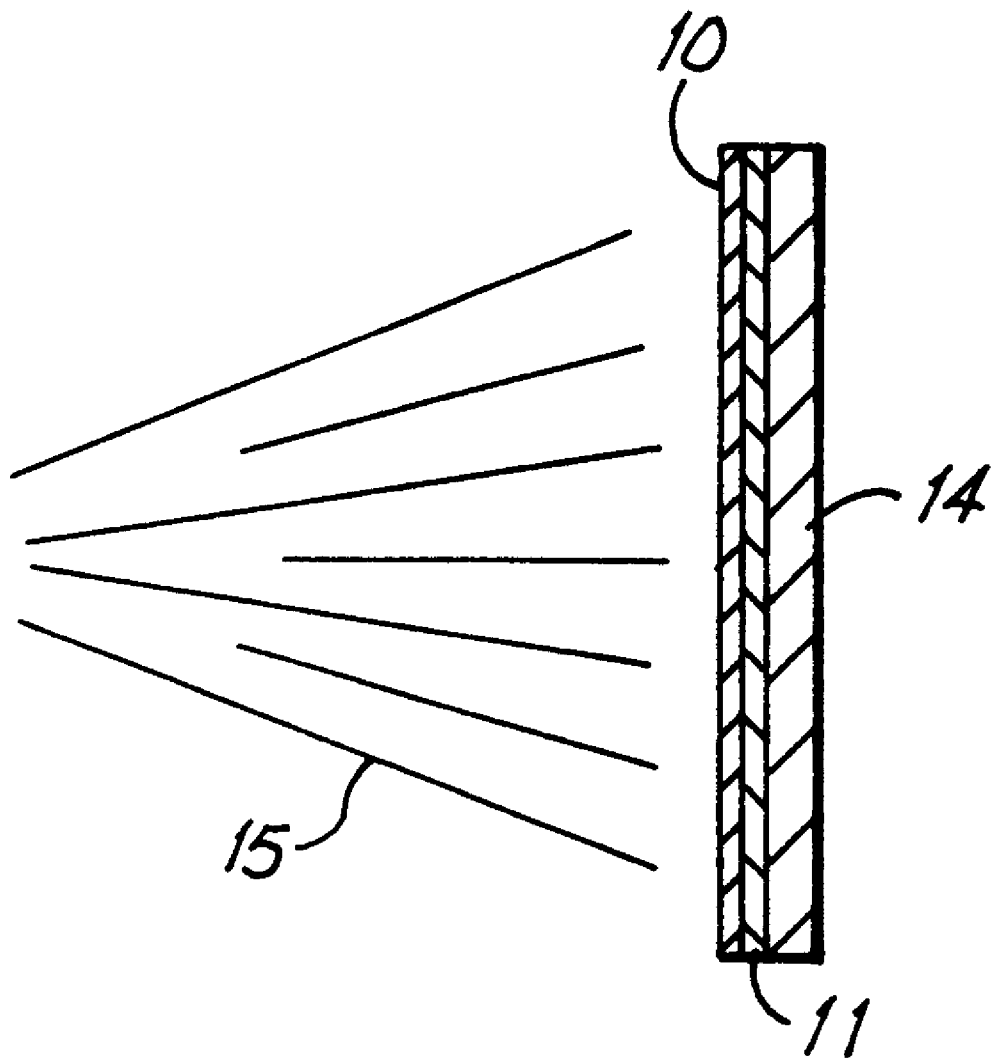

METHOD OF FORMING PREFORMS FOR METAL REPAIRS

BACKGROUND OF THE INVENTION

Metal parts, for example, those used in jet engines are generally required to meet very precise tolerances. Damage to metal parts during use or during machining where a part is overmachined can prevent the part from falling within the set tolerances and require that the part be repaired or replaced. To repair such damage, new metal must be brazed to the surface of the part.

The new metal needs to have a composition similar to the base metal or have properties consistent with the designed usage. Thus, diffusion braze fillers are combined with powder base metal to provide a composition which brazes to the base metal at a temperature lower than the melting point or softening point of the base metal.

Typically, this was done by forming a slurry which includes the powdered base metal, powdered diffusion braze filler and a binder which could be, for example, a methacrylate binder, an alginate binder or the like. These systems provide acceptable results. However, well defined geometries needed for some repairs were very difficult to obtain.

Further, slurries such as these are difficult to use. The binder system must be initially mixed. Then the precise amount of base metal and diffusion filler must be combined. This has a limited shelf life. It cannot be mass produced for sale and subsequent use if shelf life is a consideration (including settling of constituent powders). It is usually prepared by the actual user which creates the potential problem of human error.

Also, the boron typically used in the braze alloy could localize or puddle on the surface of the part. This weakens the base metal and can destroy the part. Slurries are also difficult to conform, resulting in poor ability for large build-up repairs.

A further improvement in making base metal repairs is disclosed in U.S. Pat. No. 5,952,042. This patent discloses formation of preforms from a blend of base metal powder, braze alloy powder and a polyfluorocarbon binder. This can be blended to form a tape which can be cut to size and presintered to form a preform that can then be placed on the worn area of a metal part. The metal part is then subjected to a thermal cycle which causes the preform to braze to the surface of the metal part.

This has been highly effective. However, the separate presintering process is time-consuming and adds to the expense of the preform. The presintering step does cause densification of the presintered preform. However, there is some slight shrinkage during the final brazing step. This can be compensated when forming the preform. However, it is preferable to eliminate all shrinkage.

A further method to add metal to the surface of a metal part is by thermal spraying. This has only limited applications because it can be very labor intensive, requiring a significant amount of masking in order to function properly as well as significant clean-up. Also it is difficult to precisely prepare the surface of the article which is to be sprayed and basically it is difficult to repeatedly ensure quality repairs.

SUMMARY OF THE INVENTION

The present invention is premised on the realization that a preform which can be easily bonded to a metal surface can be formed by thermal metal spraying a metal onto a substrate to form a preformed sheet. The metal can be a blend of a high melt alloy such as base metal powder or a coating powder with a low melt powder, preferably a braze alloy, a pure base metal powder (to be subsequently brazed or welded), or pure braze alloy where applicable. This preformed sheet is separated from the substrate forming a sheet. If the sheet is a blend of base alloy and braze alloy it can be cut into preforms and the preforms brazed directly onto a metal surface without use of additional braze alloys and the like. The low temperature braze alloy in the sheet will permit the sheet to melt at a lower temperature than the melting point of the high temperature and of course at a temperature lower than the melting temperature of the part being coated.

The preformed metal can be temporarily welded to the spot to provide accurate placement of the metal itself.

If the preformed sheet is the high temperature metal itself it can be bonded onto the surface of the part with a separate braze alloy or welded onto the part.

A variety of thermal spraying techniques can be used. One preferred method is high velocity oxygen fuel spraying. Other methods include wire arc spraying, flame spraying, air plasma spraying and the like. When necessary to form a dense sheet which easily separates from the support sheet, a two step process can be used. In the first step, a less aggressive thermal spraying technique is used to form a first layer. A more aggressive spraying technique is used to apply more metal to the first layer.

The objects and advantages of the present invention will be further appreciated in light of the following detailed descriptions and drawings in which the figure is a diagrammatic depiction of the method of forming the preformed sheet of the present invention.

DETAILED DESCRIPTION

The present invention is a method used to repair hard metal surfaces. Hard metal surfaces or base metals include of course all of the forms of stainless steel as well as nickel, cobalt, titanium, and tungsten based super alloys. These include Rene 35, Rene 41, Rene 77, Rene 80, Rene 80H, Rene 95, Rene 125, Rene 142, Inconel 1606, Inconel 625, Inconel 713, Inconel 718, Hastelloy X, Wasp alloy, Haynes 188, L605, X-40, MarM 509 and MarM-247.

According to the present invention, a high temperature metal is bonded to these hard metal surfaces. Generally the high temperature metal will be the same material as the surface being coated, in other words, the base metal. Alternately the present invention can be utilized to coat a hard metal surface with a separate high temperature or high melt alloy. These would include, in addition to the preceding alloys, all of the MCrAlY such as CoNiAlY, CoNiCrAlY, CoCrAlY, NiCoCrAlY, NiCrAlY. These are all high melt alloys which can be used to coat hard metal surfaces.

The high temperature metal powder can be blended with a low melt alloy powder preferably a braze alloy and thermally sprayed onto a separation sheet to form a preform sheet on the separation sheet. The preform sheet is then a blend of the high temperature alloy and the low temperature alloy. However, the sheet can be 100% braze alloy or 100% base metal alloy.

A braze alloy is typically an alloy similar in composition to the base metal or the high temperature alloy with the addition of a melt suppressant such as boron. There are many known commercially available braze alloys. The make-up of several of these compositions are listed below.

| | | |
|---|---|---|
| 1. | Boron | 2.9 |
| | Nickel | 92.6 |
| | Tin | 4.5 |
| 2. | Boron | 3.0 |
| | Chromium | 7.0 |
| | Iron | 3.0 |
| | Nickel | 83.0 |
| | Silicon | 4.0 |
| 3. | Chromium | 19.0 |
| | Nickel | 17.0 |
| | Silicon | 10.0 |
| 4. | Boron | 1.8 |
| | Nickel | 94.7 |
| | Silicon | 3.5 |
| 5. | Boron | 0.8 |
| | Cobalt | Balance |
| | Chromium | 19.0 |
| | Nickel | 17.0 |
| | Silicon | 8.0 |
| | Tungsten | 4.0 |
| 6. | Boron | 2.75 |
| | Chromium | 10.5 |
| | Nickel | 50.3 |
| | Palladium | 36.0 |
| | Silicon | 0.5 |

In use, the ratio of braze alloy to high temperature metal powder in the overall preform sheet should be from about 0.1 to about 1 up to 1.0 to 0.1 with about 20% by weight of braze alloy and 80% of high temperature metal powder preferred. Increasing the ratio of braze alloy will decrease the braze temperature but the resulting sheet will be weaker. Also excess braze alloy will result in too much flow reducing the ability of the repair to maintain its shape.

A variety of different thermal spray apparatuses can be used to practice the present invention. High velocity spray apparatuses are particularly useful such as high velocity oxygen fuel spray, HVAS, detonation gun application, wire arc spray, air plasma spray and flame spraying. If necessary, this spraying can be conducted in an inert gas shroud. However, in preferred applications, this is unnecessary.

The particle size of the metal, be it braze alloy or the high temperature alloy, or a blend, is dependent upon the particular thermal spray apparatus used. With certain thermal spray apparatuses such as a wire arc sprayer, it may be preferred to have the metals in the form of a rod or wire in order to facilitate application. But generally when powders are used such as HVOF application, the particle size should be from about −100 mesh to about +325 mesh. One preferred method of application is HVOF in which the powder is basically shot from the spray apparatus at a speed from Mach 1.2 to Mach 1.7. This apparatus uses a spray nozzle which combusts oxygen and fuel in the nozzle body forming a jet of hot air. The powder is fed into the spray nozzle which effectively heats it and sprays it at a target, preferably located about 15 inches from the gun. These spray apparatuses can use various size spray nozzles. The larger the spray nozzle, the higher the temperature of the powder as it exits the nozzle. Thus, the length of the nozzle can be changed in order to provide for the melting temperatures of different particle blends. For example, a four inch gun provides adequate heating for a nickel based high temperature powder whereas with cobalt, which melts at a higher temperature, a six inch nozzle may be preferred.

The drawing indicates diagrammatically the application of the present invention. In this apparatus, the metal layer 10 is sprayed onto a thin metal sheet 11 referred to as a separation sheet. The separation sheet is preferably a thin steel sheet such as shimstock having a thickness of about 0.010 inches. This may be grit blasted in order to provide for better adhesion of the metal particles to the surface.

The separation sheet in turn is held to a metal backing or support which is simply a rigid steel sheet 14. This prevents the separation sheet from being destroyed during the coating application. The high temperature powder and low temperature powder are uniformly mixed and fed to the HVOF apparatus (not shown). The blend of high temperature alloy and low temperature or braze alloy 15 is sprayed uniformly across the separation sheet 11. This can be done if desired with a robot or can be done manually if uniform thickness is not required.

After the desired thickness is achieved on the separation sheet, the spraying is discontinued. The sheet can be as thin as 0.003 or less. There is no actual upper limitation of thickness. However for practical purposes, the thickness would be no more than about 0.5 inches. If desired, multiple separation sheets can be placed next to each other and these can all be coated simultaneously or one large sheet can be coated.

After the coating is complete, the separation sheet is separated from the preform sheet 10. The preform sheet 10 is then cut to a desired shapes using for example a laser or a high velocity water jet cutter to form individual preforms of the desired shape.

The preforms are positioned or attached to the surface of a hard metal object. The preforms can be adhered to the hard metal surface using a high temperature adhesive. Alternatively, various methods of spot welding such as tieg welding and the like can be used to temporarily bond the preform onto the surface of the hard metal object. The object is heated to a temperature of at least about 1800° F. to 2300° F. which causes the lower temperature or braze alloy to melt and basically infiltrate the base metal alloy causing the combined structure to melt and braze or bond onto the hard metal surface. The braze alloy will then upon cooling bond the base metal powder to the metal surface.

Layer 10 can also be formed in a two step process to promote separation. With higher temperature alloys, the layer can form too tight of a bond to the separation sheet 11. In turn, this will require too much time to separate layer 10 from sheet 11.

Therefore, if desired, layer 10 can be partially formed using a less aggressive method such as, for example, flame spraying followed by a more aggressive method such as HVOF. Generally, less than one half of layer 10 will be applied using the less aggressive spray technique because the more aggressive the spray technique, the denser the sheet. This reduces shrinkage. HVOF achieves near theoretical density and, therefore, is preferred. Further, it is preferable to form as much of layer 10 using the most aggressive deposition technique available.

The present invention can also be used to simply form a preform sheet from the high temperature alloy itself without the braze alloy. Such a sheet again would be formed in the same manner as the preform sheet with the braze alloy utilizing the same equipment and the separation sheet bonded to a support or a substrate.

In this instance the preform sheet would again be cut with for example a laser or water jet and bonded to a hard metal surface. However, as there is no braze alloy in the preform, different methods of bonding would be utilized. A layer of braze alloy can be positioned between the hard metal surface and the preform to bond the high temperature preform to the hard metal surface. Alternately welding methods can be used such as electron beam welding, tieg welding, arc welding, resistance welding and the like.

Regardless of the particular preform applied to the hard metal surface, once the preform is bonded to the hard metal surface, it can be machined down to the desire shape and tolerances and will function basically in the same manner as the original metal surface.

Both preform sheets of the present invention provides a reliable means to build up a metal surface or coat a metal surface with a high temperature alloy. The method is very precise and provides a means to apply metal with near theoretical density. This is difficult using presintered preforms. As such, shrinkage is minimized. Further, the preforms of the present invention are less expensive to manufacture since a presintering step is avoided and of course easier to apply since one does not have to compensate for shrinkage.

This has been a description of the present invention along with the preferred methods of practicing the present invention. However, the invention itself should only be defined by the appended claims wherein

I claim:

1. The method of repairing a worn area of a part of a jet engine, said part formed from a super alloy, said method comprising:

blending base metal alloy with braze alloy to form an alloy blend;

forming a sheet of said alloy blend by thermally spraying said blend onto a separation sheet to form an alloy sheet;

separating said separation sheet from said alloy sheet;

cutting a preform from said alloy sheet;

placing said preform onto a worn area; and heating said part to a temperature above the melting point of said preform and below the melting point of said super alloy to thereby fuse said preform to said worn area.

2. The method claimed in claim 1 wherein said thermal spraying comprises wire arc spraying.

3. The method claimed in claim 1 wherein said braze alloy comprises a powder.

4. The method claimed in claim 1 wherein said alloy comprises a powder.

5. The method claimed in claim 4 wherein said braze alloy is about 20% by weight of said alloy blend.

6. The method of claim 1 wherein said alloy blend is thermally sprayed onto said separation sheet using two different thermal spray methods.

* * * * *